Feb. 18, 1936.  M. PAUL ET AL  2,031,061
FLUID CONTROL VALVE FOR VACUUM BRAKE SYSTEMS
Filed April 30, 1934  3 Sheets-Sheet 1
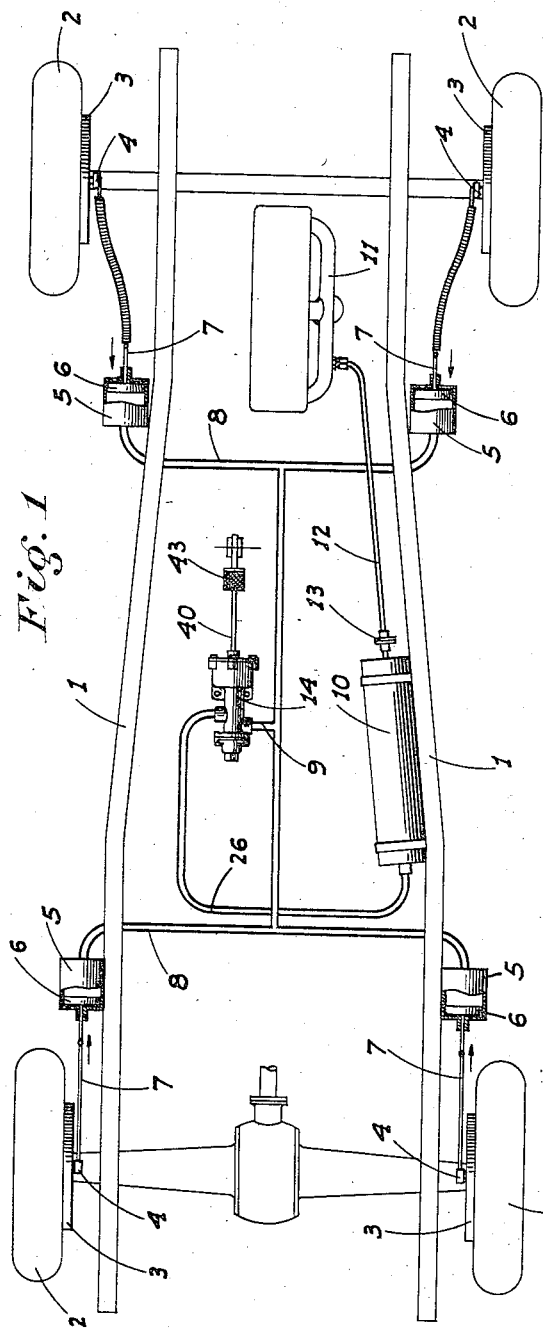
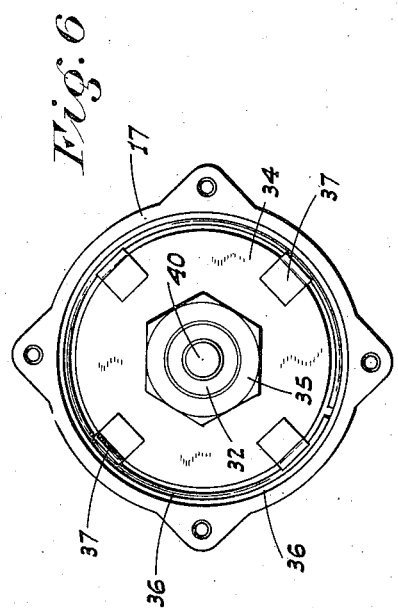
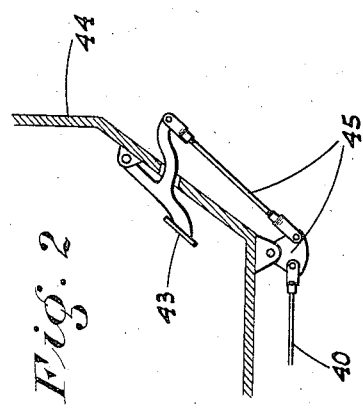
INVENTORS
*Max Paul*
*Walter Gyr*
BY
ATTORNEY Feb. 18, 1936.  M. PAUL ET AL  2,031,061
FLUID CONTROL VALVE FOR VACUUM BRAKE SYSTEMS
Filed April 30, 1934  3 Sheets-Sheet 2
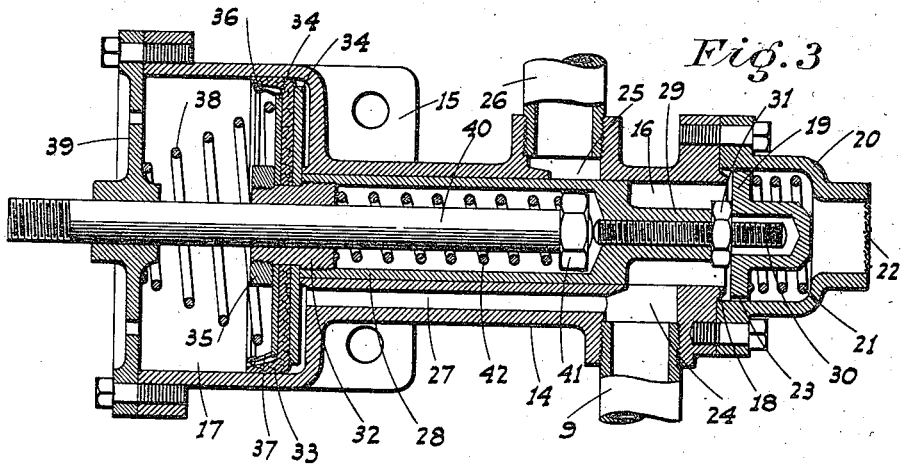
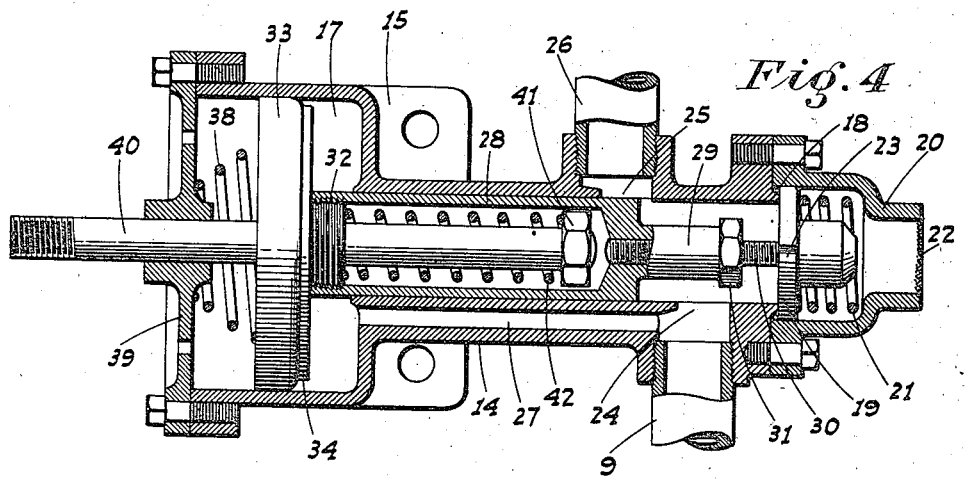
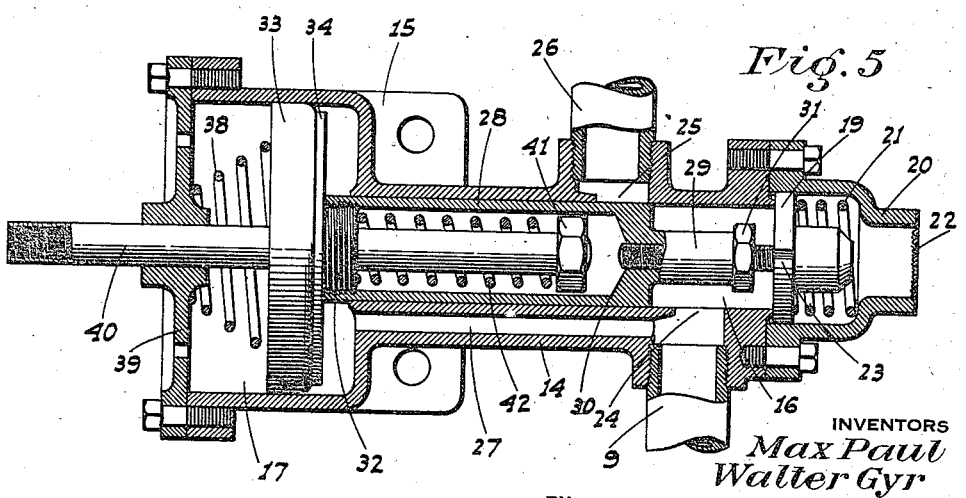
INVENTORS
*Max Paul*
*Walter Gyr*
BY
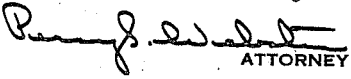
ATTORNEY

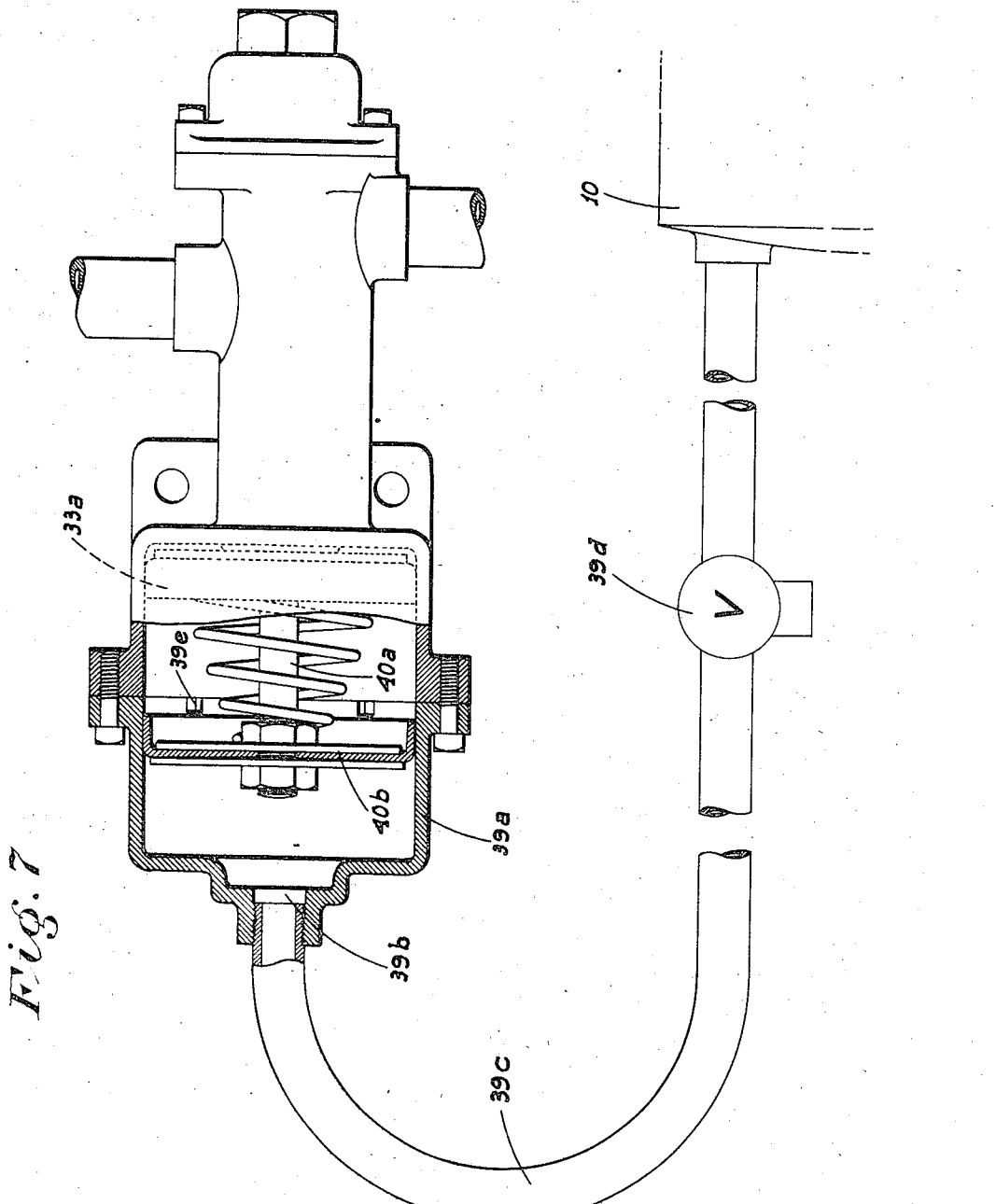

Patented Feb. 18, 1936

2,031,061

UNITED STATES PATENT OFFICE 2,031,061

FLUID CONTROL VALVE FOR VACUUM BRAKE SYSTEMS

Max Paul and Walter Gyr, Stockton, Calif., assignors of one-third to Prentice M. Miles, Stockton, Calif.

Application April 30, 1934, Serial No. 723,193

8 Claims. (Cl. 303—54)

This invention relates to vacuum brake systems for motor vehicles, one of our objects being to provide a system of this character arranged so that a very even braking action will be imparted to all the wheels whether this action be light or heavy as the operator may desire, and yet without any locking of the brake drums such as will cause the wheels to slide.

Another important object is to provide a foot actuated control valve for the system, arranged to be automatically acted on by the vacuum pressure in the brake cylinders after a foot actuation of the valve has been made, to hold the brakes set as long as desired at the same pressure which was initially imparted thereto by the foot actuation of the valve. This insures an even and steady braking action being had, whether a gradual or a sudden stop is desired. We have also provided means in the valve for instantly relieving the vacuum pressure and thus releasing all the brakes simultaneously the instant the foot pressure on the pedal is withdrawn.

Another object is to provide means in the valve for transmitting a resisting pressure against the foot which will be proportionate to the braking action imparted to the wheels, so that the operator will be able to judge by the resistance offered the amount of pressure he is causing to be applied to the brakes. The likelihood of an undesired extremely sudden brake application being made is thus greatly lessened.

A further object is to provide a valve unit which is of an extremely simple and long wearing character in which there is little chance of the failure of any part such as would interfere with the operation of the valve and which might cause disaster.

These objects we accomplish by means of such structure and relative arrangement of parts as will fully appear by a perusal of the following specification and claims.

In the drawings similar characters of reference indicate corresponding parts in the several views:

Figure 1 is a diagrammatic plan of a motor vehicle chassis showing our improved brake system mounted thereon.

Figure 2 is a side elevation of the preferred form of foot control device.

Figure 3 is a sectional elevation of the valve in its normal closed position.

Figure 4 is a similar view of the valve showing the position of the parts the instant a brake application is made.

Figure 5 is a similar view showing the valve as closed by the vacuum pressure so as to hold the brakes applied.

Figure 6 is an end view of the valve body with the cover plate removed.

Figure 7 is a plan view, partly in section, of a modified form of valve showing how it may be operated by remote control.

Referring now more particularly to the characters of reference on the drawings, the numeral 1 denotes a conventional motor vehicle frame supported on front and rear wheels 2, each of which has a brake structure of the mechanical type, indicated at 3, and each such structure having an actuating element 4 projecting therefrom. Any standard type of brake may be used so that it is not deemed necessary to illustrate or describe the same in detail.

For each brake I provide a vacuum cylinder 5 secured to the frame 1 and having a piston 6 slidable therein. The piston is connected to the corresponding brake element 4 by a pull cable or rod 7. Vacuum pipes 8 are connected to different cylinders at such points as to cause a vacuum or negative pressure in the pipes to move the pistons in a valve applying direction, and extending to a common pipe 9 which is connected to the valve as will be seen later. It will of course be understood that the brake cylinders are open to atmosphere at the end opposite the point of connection of the pipes 8 therewith. A vacuum tank 10 is secured to the frame 1 and is connected to the intake manifold 11 of the engine by a suitable conduit 12 with a check valve, indicated at 13, therein opening toward the manifold.

The valve which controls the flow of negative pressure between the brake cylinders and the tank 10 comprises a body 14 provided with a suitable flange 15 whereby it may be rigidly secured to the chassis at any suitable point. The body is formed with a relatively long cylinder 16 and a larger but shorter cylinder 17 at one end of and axially alined with the same, said cylinder 17 facing the front end of the vehicle.

The end of the cylinder 16 opposite the cylinder 17 is formed with a seat 18 for an axially movable valve 19 which is slidable within a housing 20 secured on the adjacent end of the cylinder and which is pressed against its seat by a spring 21. The housing is open to the atmosphere, the opening being covered by a suitable screening 22 to prevent the admission of dust and foreign matter with the air drawn into the housing. This valve is provided with peripheral longitudinally extending grooves 23 so that when said valve is moved off its seat, it will establish communication between the atmosphere beyond the valve and the adjacent end of the cylinder 16 past the valve seat.

A port 24 is formed in the valve body 14 to communicate with the cylinder 16 a short distance in front of the valve seat and is connected to the adjacent end of the pipe 9. A similar port 25 communicates with said cylinder a short distance ahead of the port 24 and is connected to the adjacent end of a pipe 26 which extends to the vacuum tank 10. A passage 27 leads along the valve body 14 from the port 24 to the adjacent end of the cylinder 17.

Slidably fitted in the cylinder 16 is a hollow piston valve 28, closed on its end facing the valve 19 and provided on said end with a reduced axial extension 29. This extension has an adjusted screw 30 threaded axially therethrough and projecting into the hollow area of the valve 28 and adjustably clamped against rotation by a nut 31 on the outer end of said extension.

One end of the piston valve projects into the cylinder 17 and in said end and projecting therefrom a bushing 32 is mounted. A leather cup plunger 33 is disposed on the bushing in connection with front and back plates 34, these parts being clamped against the adjacent end of the piston valve by a nut 35 on the bushing. The cup flange faces toward the front end of the cylinder 17 which is open to the atmosphere and is held in positive non-leaking engagement with the wall of the cylinder by an expansible spring ring 36 which is located in proper relation to the cup by grooved supports 37 mounted on and projecting forwardly from the adjacent plate 34.

A compression spring 38 is disposed between the front plate 34 and the front cover plate 39 of the cylinder 17 and acts to hold the plunger 33 against the back end of the cylinder 17. The piston valve 28 being rigid with the plunger is also held in its rearmost position. In this position the piston valve leaves the port 24 wide open but not only covers the port 25 but extends some distance rearwardly of the same. Also the nut 31 presses against the valve 19 and moves the same to an open position.

An operating rod 40 slidably projects through the cover 39 and through the bushing 32 into and along the hollow interior of the piston valve, so as to contact with the adjacent end of the screw 30, and having an enlarged head 41 on its inner end. A compression spring 42 stronger than the spring 38 extends between said head and the bushing and acts to hold the rod in contact with the screw 30, the tension of this spring being adjusted by adjusting said screw.

The rod is adapted to be moved forwardly to apply the brakes and is connected for such movement to a suitable pedal 43 which is preferably of a type similar to the conventional foot gas throttle or accelerator. This pedal is pivoted on the foot board 44 of the vehicle and is connected to the rod 42 so as to pull the same forwardly when the pedal is depressed by a suitable connecting linkage 45.

*Operation*

As soon as the pedal is depressed and the rod 40 is pulled forwardly it tends to increase the tension on the spring 42 and when the pressure thus being transmitted to the spring 38 overcomes the resistance of the same, the piston valve is drawn forwardly. The piston valve is thus moved to uncover the port 25, as shown in Figure 4, the extent of opening or uncovering movement of course depending on the amount the rod 40 is advanced and the resultant compression of the spring 38. It will thus be seen that the operator will be able to determine, by the resistance offered to his foot, the extent to which he is opening the valve, since the greater the opening movement the greater will be the resistance initially offered by said spring.

With the initial advance of the piston valve and before the port 25 is uncovered, the nut 31 moves away from the air valve 19 and the latter closes against the seat 18, sealing the cylinder 16 against atmospheric pressure. As soon as the port 25 opens communication is established between the pipes 9 and 26 and a negative pressure flow from the pipe 9 to the pipe 26 and away from the brake cylinders is had. Air will then rush into the cylinders ahead of the pistons, pushing the latter along the cylinders and of course applying the brakes. As soon as communication is thus established between the pipes 9 and 26, negative pressure is also established in the passage 27, causing atmospheric air pressure to act on the plunger 33 and force the same rearwardly, it being assumed that it is desired to hold the brakes applied and that the foot pressure on the pedal is being maintained even. This movement is aided by the spring 38 but resisted by the spring 42.

The difference in pressure between the positive air pressure and the negative vacuum pressure in the passage 27 however is sufficiently greater than such spring resistance to cause the piston valve to be moved to a closed position relative to the port 25. This holds whatever negative pressure is in the pipe 9 and brake cylinders against increase, so that a steady brake applying action is maintained.

The tension of the spring 42 is initially set so that regardless of the amount the spring must be compressed and the distance the piston valve must be moved to a closing position, and which depends on the initial movement of the foot rod and the corresponding extent of opening of the port 25, the difference between atmospheric pressure on the plunger 33 and the negative pressure on the opposite side of the same, will always be proportionate to the spring tension. In this manner the piston valve will be moved only sufficient to close the port 25 before the spring pressure is equal to the difference between the negative and atmospheric pressures. The piston valve however will not move sufficient to cause the valve 19 to be unseated and the valve cylinder and the pipe lines will still be closed to atmosphere. As soon however as the foot is removed from the pedal the spring 42 acts to move the rod 40 rearwardly and its tension is released, causing further movement of the plunger 33 by atmospheric pressure thereon, aided by the spring 38 until the nut 31 contacts with and opens the valve 19. Air then immediately rushes into the valve cylinder and through the pipe 9 into the pipes 8 and the brake cylinders, restoring the same to a neutral condition and of course causing the brakes to be immediately released.

In Figure 7 is shown a modified form of valve operable by remote control rather than by direct connection with a foot pedal. In this form of the valve the cover plate 39 is removable and a cylinder housing 39a is substituted therefor. The stem 40a instead of projecting outside the valve for connection with the foot pedal terminates within the cylinder 39a and is there secured to a piston 40b of similar construction to the piston 33a in the valve and having its face opposed to an orifice 39b in the end of the cylinder 39a. A conduit 39c places the cylinder 39a in communication with a source of vacuum as for instance the tank 10. A manual control valve 39d may be interposed at any desired point in the line as for instance at a convenient location adjacent the steering wheel of the vehicle. Atmospheric ports 39e will be provided in the cylinder 39a between the piston 33a and the piston 40b.

Manipulation of the valve 39d may be had to open communication between tank 10 and cylinder 39a. The negative pressure will then act on the piston 40b to draw it toward the outer end of the cylinder 39a thus imparting to the rod 40a the same action as when the foot pedal in the other form of valve is utilized. The action of the valve is otherwise the same so the detailed description thereof will not be here repeated.

This modified form of valve will be used on trailers or in places where ready connection with a foot control pedal is not available. When used on a trailer it may, when desired, be hooked up to work in synchronism with a foot controlled valve on the primary vehicle. Such hook-up will vary according to different conditions, so no detailed description thereof is here indulged in.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A valve unit for a vacuum braking system comprising a valve chamber, open at one end to atmosphere, a hollow piston valve slidable in the chamber, an outwardly opening air valve to close the open end of the chamber, said chamber having longitudinally spaced ports near the open end of the chamber, the port nearest the said end being adapted for connection to a brake pipe and the other being adapted for connection to a source of negative pressure, the piston valve normally closing the last named port but the other port being always open, and said valve also then holding the air valve open, a foot actuated rod slidably projecting into the piston valve from its end opposite the ports, a compressible spring between the piston valve and rod acting to cause said valve to yieldably move with the rod when the latter is pulled away from the ported end of the chamber whereby the valve will be moved to open the second named port and allow the air valve to close, and means within the valve unit actuated upon the establishment of communication between the ports to cause the piston to be retracted sufficiently without movement of the foot actuated rod to close said second named port but insufficiently to engage and open the air valve.

2. A valve unit for a vacuum braking system comprising a valve chamber, open at one end to atmosphere, a hollow piston valve slidable in the chamber, an outwardly opening air valve to close the open end of the chamber, said chamber having longitudinally spaced ports near the open end of the chamber, the port nearest the said end being adapted for connection to a brake pipe and the other being adapted for connection to a source of negative pressure, the piston valve normally closing the last named port but the other port being always open, and said valve also then holding the air valve open, a foot actuated rod slidably projecting into the piston valve from its end opposite the ports, a compressible spring between the piston valve and rod acting to cause said valve to yieldably move with the rod when the latter is pulled away from the ported end of the chamber whereby the valve will be moved to open the second named port and allow the air valve to close so that communication is established between the ports and the valve chamber is closed to atmosphere, a cylinder beyond and axially alined with the other end of the valve chamber, the outer end of the cylinder being open to atmosphere, and a plunger in said cylinder connected to the piston valve, there being a passage from the first port to the inner end of the cylinder.

3. A structure as in claim 2 in which the tension of the spring is such relative to the size of the plunger that said tension will be equal to the difference between atmospheric and negative pressures acting on the plunger when the piston valve has been moved to a port closing position but not to an air valve opening position and the rod is still in an advanced position.

4. A structure as in claim 1 with additional means to cause the piston valve to be further retracted to an air valve opening position when the foot pressure on the rod is released.

5. A control valve for a vacuum braking system comprising a valve chamber having an atmospheric port at one end, a brake-pipe port adjacent said end and a negative pressure supply port beyond said brake-pipe port, an enlarged chamber formed as an extension of the chamber at its opposite end, a bypass passage between the brake pipe port and the adjacent end of said enlarged chamber, a hollow piston valve slidable in the valve chamber and normally closing the supply port, a plunger slidable in the enlarged chamber and rigid with said piston valve, an outwardly opening valve normally closing the atmospheric port, an extension on the piston valve engaging and holding said last named valve open when the piston valve is moved over the supply port a distance greater than necessary to close the same, a foot actuated rod slidably projecting into the piston valve from the plunger end of the same, and a compression spring about the rod within the piston valve acting to yieldably resist longitudinal movement of the rod relative to the piston valve in the direction away from the ported end of the chamber.

6. A structure as in claim 5, with a compression spring of lesser resistance than the rod spring, acting in opposition to said rod spring.

7. A structure as in claim 5, with means to adjust the initial tension of said spring at will.

8. A structure as in claim 5, with an adjustment screw extending lengthwise of the piston valve and mounted in and projecting from the extension thereof to engage the adjacent end of the rod, and a removable cage on the said one end of the valve chamber and in which the atmospheric valve is mounted, whereby the screw may be exposed for manipulation.

MAX PAUL.
WALTER GYR.